Oct. 7, 1941.  A. A. VAN ATTA  2,258,523
DOOR OR SCREEN
Filed Nov. 17, 1939    6 Sheets-Sheet 3
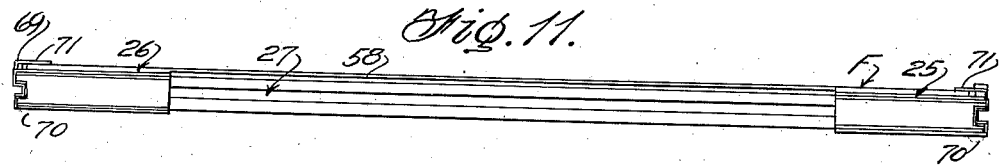
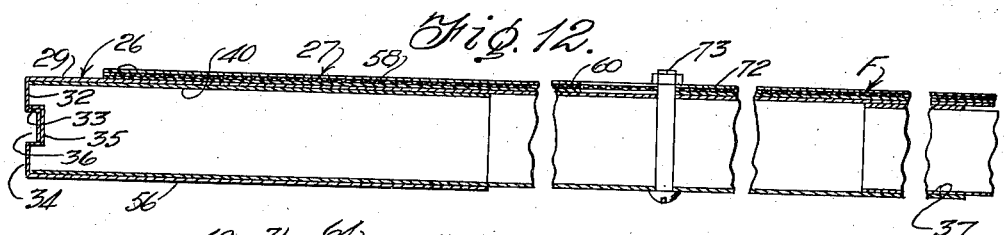
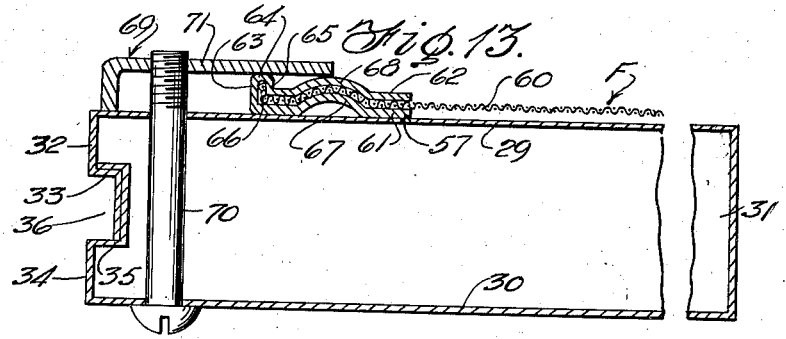
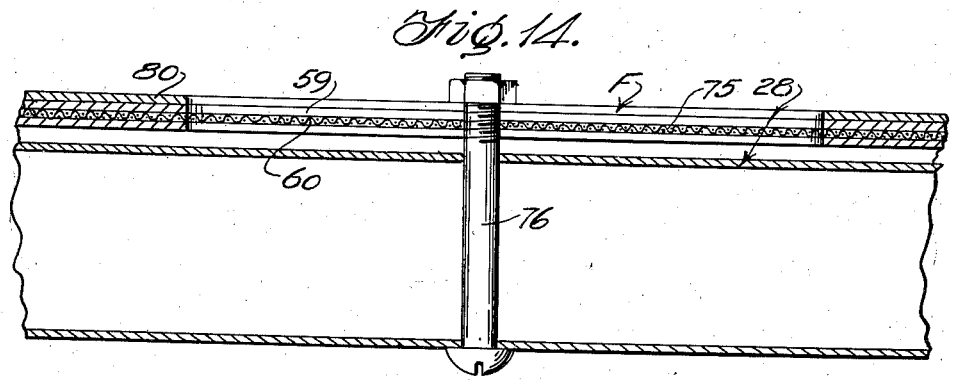
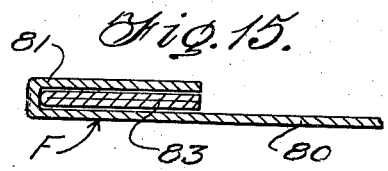
Inventor
ARTHUR A. VAN ATTA,
By Kimmel & Crowell
Attorneys

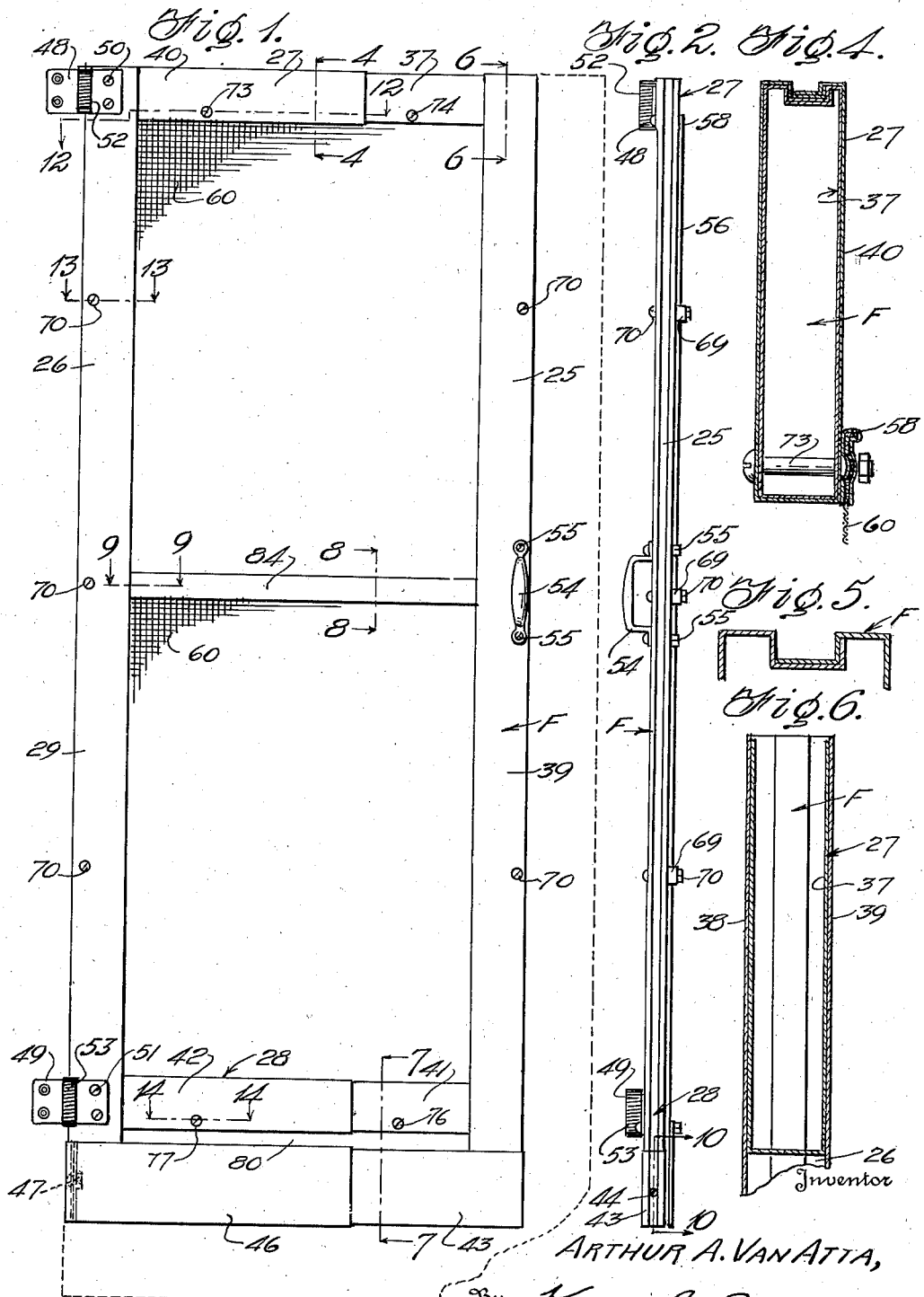

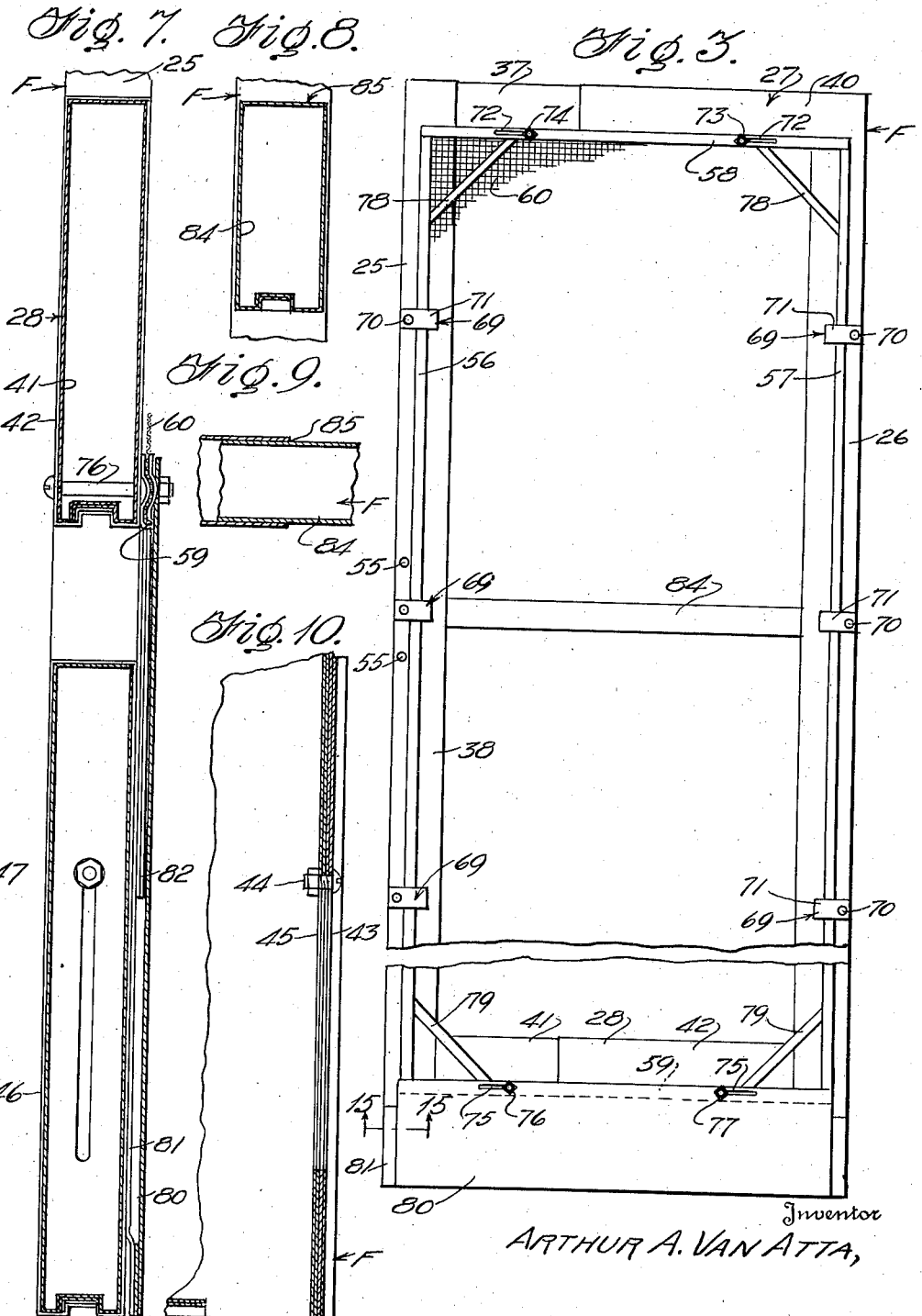

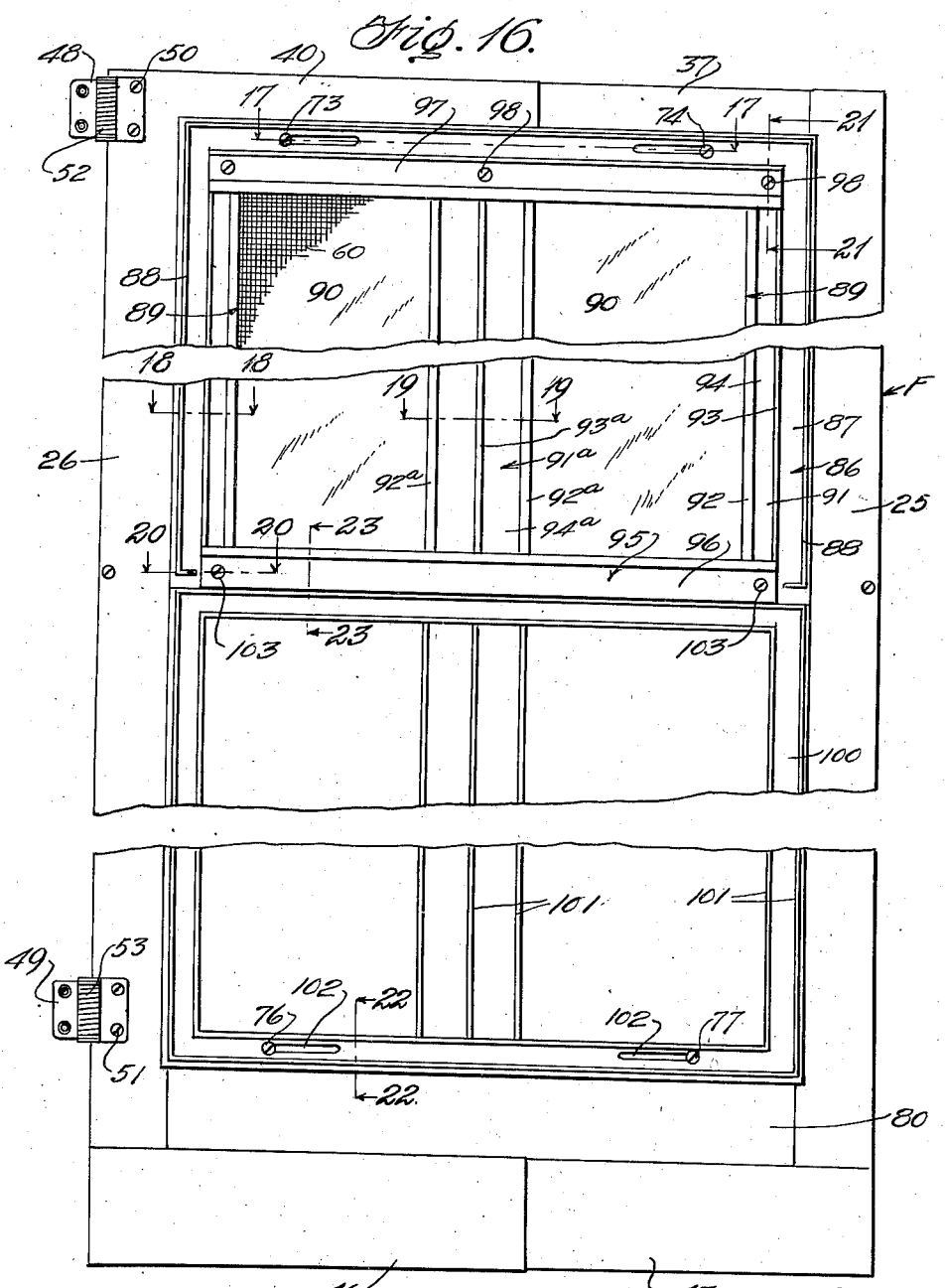

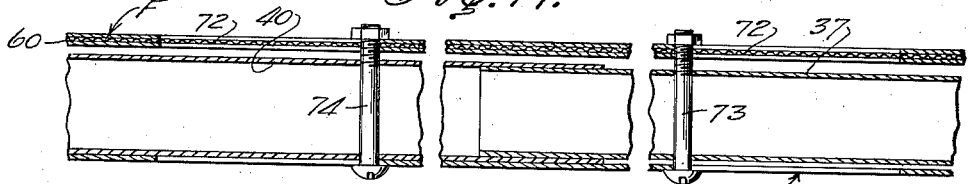
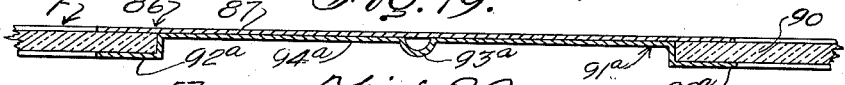
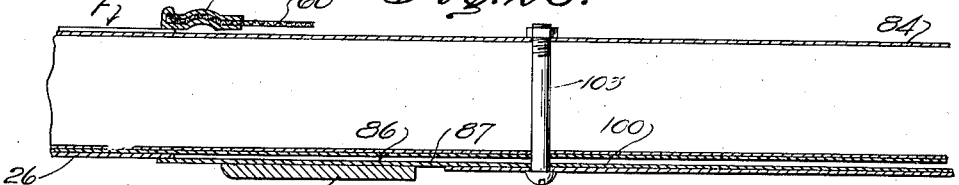
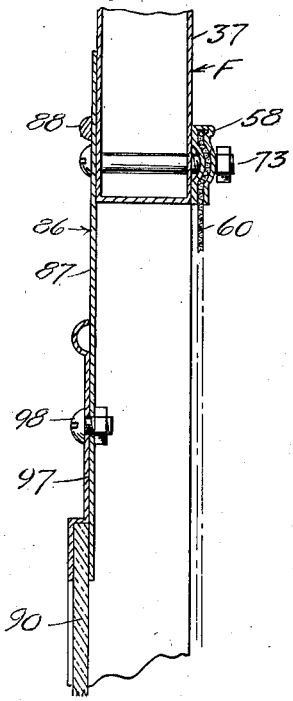
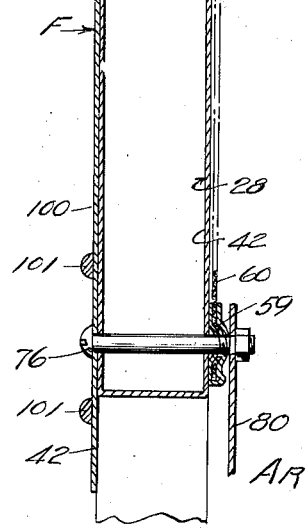
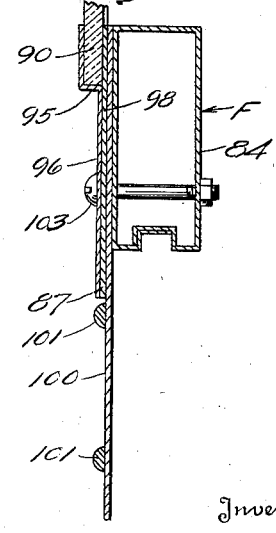

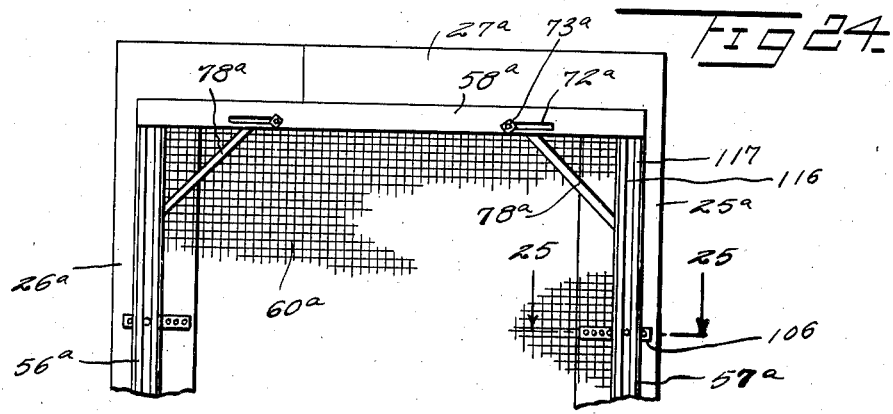
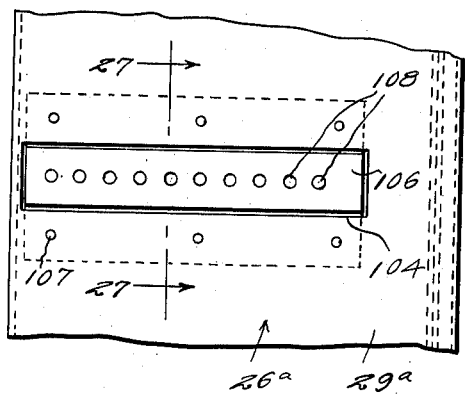
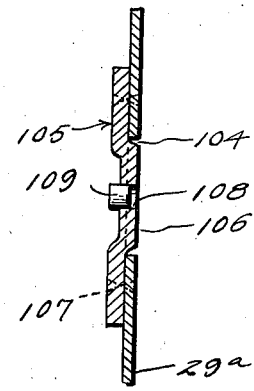
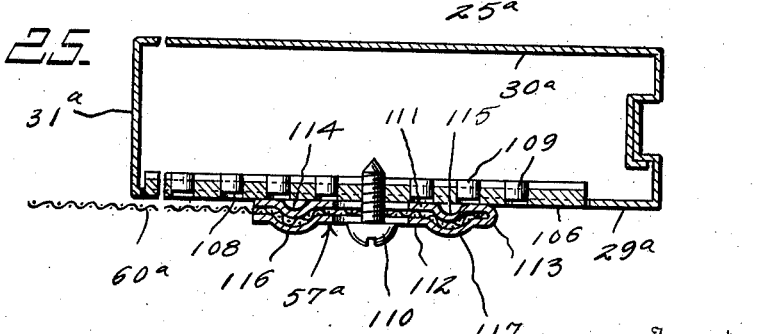

Patented Oct. 7, 1941

2,258,523

UNITED STATES PATENT OFFICE 2,258,523

DOOR OR SCREEN

Arthur A. Van Atta, Marion, Ohio

Application November 17, 1939, Serial No. 305,019

12 Claims. (Cl. 156—38)

This invention relates to screen doors, window screens and the like and more particularly to a metal frame for a door or sash.

An object of this invention is to provide an improved sash of substantially tubular construction which is adapted to be made out of sheet metal bent to the proper configuration and which is of such a character that the frame can readily be constructed out of conventional tools or equipment.

A further object of this invention is to provide a frame structure of this kind which is so constructed that it may be readily adapted to use with either a screen door or panels in the form of plates or glass so as to provide a convertible frame structure which may be used for screens or solid panels.

A further object of this invention is to provide an improved frame structure which is provided with telescoping portions so that the frame may be readily adapted to the desired opening.

A still further object of the invention is to provide a frame structure which includes a screen panel mounted in the separate frame adapted to be secured to the door or sash frame so that when the screen becomes worn, the screen may be easily and quickly replaced.

A further object of this invention is to provide an improved screen frame for use with a metal outer frame which is adapted to tightly hold the screen therein.

With the foregoing objects and others which may hereinafter appear, the invention consists of the novel construction, combination and arrangement of parts as will be more specifically referred to and as illustrated in the accompanying drawings, wherein are shown embodiments of the invention, but it is to be understood that changes, modifications and variations may be resorted to which fall within the scope of the invention as claimed.

In the drawings:

Figure 1 is a detail front elevation of a screen door constructed according to an embodiment of this invention, Figure 2 is a detail side edge elevation of the screen door, Figure 3 is a detail rear elevation partly broken away of the door, Figure 4 is an enlarged sectional view taken on the line 4—4 of Figure 1, Figure 5 is an enlarged fragmentary sectional view through one of the tubular frame members showing the manner of locking the frame members together, Figure 6 is an enlarged fragmentary sectional view taken on the line 6—6 of Figure 1, Figure 7 is an enlarged sectional view taken on the line 7—7 of Figure 1, Figure 8 is an enlarged sectional view taken on the line 8—8 of Figure 1, Figure 9 is an enlarged fragmentary sectional view taken on the line 9—9 of Figure 1, Figure 10 is an enlarged fragmentary sectional view taken on the line 10—10 of Figure 2, Figure 11 is a detail top plan of the frame structure, Figure 12 is an enlarged fragmentary sectional view taken on the line 12—12 of Figure 1, Figure 13 is an enlarged fragmentary transverse sectional view taken on the line 13—13 of Figure 1, Figure 14 is an enlarged fragmentary longitudinal sectional view taken on the line 14—14 of Figure 1, Figure 15 is an enlarged fragmentary sectional view taken on the line 15—15 of Figure 3, Figure 16 is a detail front elevation partly broken away of a door having a frame similar to the frame shown in Figures 1, 2 and 3 wherein transparent and solid panels are mounted on the side of the frame opposite the screen and screen frame, Figure 17 is an enlarged fragmentary sectional view taken on the line 17—17 of Figure 16, with the parts spread apart, Figure 18 is an enlarged fragmentary sectional view taken on the line 18—18 of Figure 16, Figure 19 is an enlarged fragmentary sectional view taken on the line 19—19 of Figure 16, Figure 20 is an enlarged fragmentary sectional view taken on the line 20—20 of Figure 16, Figure 21 is an enlarged fragmentary sectional view taken on the line 21—21 of Figure 16, Figure 22 is an enlarged fragmentary sectional view taken on the line 22—22 of Figure 16, Figure 23 is an enlarged fragmentary sectional view taken on the line 23—23 of Figure 16, Figure 24 is a fragmentary side elevation of a modified form of door structure, Figure 25 is an enlarged fragmentary sectional view taken on the line 25—25 of Figure 24, Figure 26 is an enlarged fragmentary side elevation of one stile of the door, and Figure 27 is a fragmentary enlarged sectional view on the line 27—27 of Figure 26.

Referring to the drawings, and first to Figures 1 to 15 inclusive, the character F designates generally a frame structure which in the present instance is constructed in the form of a metal tubular frame formed as a door. It will be understood however, that the frame F may be readily adapted for use as a window sash.

The frame F comprises a pair of vertical stiles 25 and 26 and a pair of upper and lower rails 27 and 28. The stiles 25 and 26 are constructed in tubular form and each comprises an elongated strip of sheet metal formed with parallel side walls 29 and 30, an end wall 31 integral with the side walls 29, 30 and overlapping and interlocking opposite or outer end walls. The side wall 29 is provided with a right angular extension or end wall member 32 which has an L-shaped member 33 integral therewith and inwardly offset therefrom. The side wall 30 is provided with a right angular extension 34 having a U-shaped extension 35 integral therewith and inwardly offset so that the U-shaped member 35 will engage about the L-shaped member 33 and coact therewith in the provision of a channel 36. The U-shaped member 35 has one leg thereof engaging about the inwardly projecting leg of the L-shaped member 33 and the opposite leg of the L-shaped member 33 forms the bottom of the channel 36 and engages against the bight of the U-shaped member 35. In this manner, the U-shaped member 35 and the L-shaped member 33 are interlocked so that the two side walls 29 and 30 are held against movement relative to each other.

The stile 25 is provided at its upper end with a right angular disposed rail section 37 constructed similar to the construction of the side stile 25 and the stile 26 and this rail section 37 is adapted, as shown in Figure 6, to telescope between the side walls 38 and 39 of the stile 26. The contacting portions of the opposite sides of the rail 37 are adapted to be spot welded or otherwise fixedly secured to the side walls 38 and 39 so that the rail member 37 will be firmly held in right angular relation to the stile 25. The stile 26 is provided at its upper end with a rail section 40 which as with the rail section 37 is adapted to telescope into the upper end portion of the stile 26 similar to the construction shown in Figure 6 and to be spot welded or otherwise fixedly secured in the upper end of the stile 26. The inner end of the rail member 37 is adapted to telescope within the adjacent end of the rail member 40 so that the length of the rail comprising the two rail members 37 and 40 may be adjusted to position the stiles 25 and 26 against the vertical portions of a door or window opening. The rail members 37 and 40 are adapted to be held in adjusted position by means hereinafter described.

The lower end of the stile 25 is provided with rail member 41 similar to the rail member 37 which telescopes into the lower end of the stile 25 and is welded or otherwise fixedly secured therein so that the rail member 41 will be securely held in right angular relation to the stile 25. A second lower rail 42 is secured at its outer end in telescoping relation in the lower portion of the stile 26 and is adapted to telescope over the inner end of the rail member 41 so as to provide a telescoping rail coacting with the upper telescoping rail comprising the two members 37 and 40 in adjusting the stiles 25 and 26 in parallel relation.

The lower rail members 41 and 42 are positioned at a point upwardly from the lower ends of the stiles 25 and 26 and a hollow substantially tubular member 43 engages about the lower projecting end of the stile 25 and is held in vertically adjusted position along the lower end of the stile 25 by means of a bolt 44 which is extended through the outer end of the bottom member 43. The adjacent edge of the stile 25 is provided with an elongated slot 45 through which the bolt 44 is adapted to pass so that the bottom member 43 may be tightly secured in its adjusted position at the lower end of the stile 25. By means of this bottom member 43, the length of the door may be adjusted to fit the length of the door opening. A second bottom member 46 is secured to the lower end of the stile 26 engaging about the lower end of the stile 26 in a manner similar to the bottom member 43, and this bottom member 46 is secured to the lower end of the stile 26 by means of a bolt 47. The inner end of the bottom member 46 is adapted to telescope over the inner end of the bottom member 43 so that with the width of the bottom member comprising the two parts 43 and 46 may be adjusted to fit the width of the door opening.

A pair of hinge members 48 and 49 have one leaf thereof secured as by bolts 50 and 51 respectively to the side stile 26 but if desired, the hinge members 48 and 49 may be secured to the stile 25 which may be provided with suitable bolt openings for the bolts 50 and 51 so that the frame F may be secured in a door opening and may have either the stile 25 free to swing or the stile 26 free to swing out of the opening. Preferably, the hinged members 48 and 49 are provided with tensioned springs 52 and 53 respectively which are adapted to constantly urge the door to a closed position.

A looped handle 54 is secured to the stile 25 at a suitable point intermediate the length thereof being secured by means of bolts 55. These bolts 55 also extend entirely through the stile 25 so that where it is desired to open a door from the opposite side the handle 54 may be secured to the stile 26 at which time the hinges 48 and 49 will be secured to the other face of the stile 25.

A screen panel structure comprising a metal frame including side stiles 56 and 57, an upper rail 58 and a bottom rail 59 is adapted to be disposed in face abutting relation to one side of the frame F. The screen frame is provided with a wire screen 60 which is secured within the side stiles 56 and 57, the upper stile 58 and the lower rail 59. The side stiles or frame members 56 and 57 are of substantially identical construction, the details of which are shown on an enlarged scale in Figure 13. In like manner, the upper and lower rails 58 and 59 are constructed similar to the side stiles 56 and 57. As shown in Figure 13 the side stiles 56 and 57 are constructed in the form of a pair of plates 61 and 62 which are connected together by an end wall member 63 and the end wall member 63 is provided with a right angular inwardly projecting extension 64 which is in turn connected to the outer plate member 62 by a substantially right angular extension 65. In this manner, the two plate members 61 and 62 are held in spaced apart and substantially parallel relation and an L-shaped chamber 66 is provided at their outer ends within which the screen wire 60 is adapted to engage. The inner member 61 is provided at a point intermediate the opposite edges thereof with an outwardly offset bead 67 and the outer member 62 is also provided with an outwardly offset arcuate bead 68 confronting the bead 67. The wire 60 engages between the two beads 67 and 68 and projects beyond these beads 67 and 68 so that the outer edge of the screen 60 will be disposed in the outer L-shaped chamber 66. The screen frame comprising the side stiles 56 and 57 and the two rails 58 and 59 is held in adjusted position against the side stiles 25 and 26 by means of a plurality of L-shaped clamping members 69 which are held in clamping position by means of bolts 70 engaging through the walls 29 and 30 and preferably, the bolts 70 are threaded into the outer or longer leg 71 of the clamping member 69. This clamping leg 71 is adapted to engage over the outer edge of a frame member engaging over the inwardly projecting extension 64 and also engaging over the outer surface of the bead 68 as shown in Figure 13 so that the inner member 61 will be held flat against the outer surface of the wall member 29.

The upper rail 58 of the screen frame is provided with a pair of elongated slots 72 through which bolts 73 and 74 are adapted to engage. The bolts 73 and 74 engage through the upper rail members 40 and 37 respectively so that when these two bolts 73 and 74 are tightened so as to hold the rail member 58 in adjusted position, the two rail members 37 and 40 will also be held against lengthwise movement.

The lower rail member 59 is provided with a pair of elongated slots 75 through which bolts 76 and 77 engage and these bolts 76 and 77 are extended through the rail members 41 and 42 and hold these rail members 41 and 42 against lengthwise movement while at the same time holding the lower rail flat against the lower portion of the frame F. A pair of brace members 78 are secured diagonally across the corners formed between the stiles 56 and 57 and the rail 58, being preferably welded or otherwise secured between the plate members 61 and 62. Lower bracing members 79 are also provided adjacent the lower ends of the side stiles 56 and 57 and are also secured to the bottom rail 59.

A bottom plate member 80 which is provided with reverted opposite end portions 81 is adapted to engage the lower projecting end portions 82 and 83 of the side stiles 56 and 57 respectively. This bottom plate member 80 is also provided at its upper edge with a pair of slots similar to slots 75 which are adapted to register with the slots 75 so that the bolts 76 and 77 may pass through such plate slots and tightly secure the plate 80 to the lower end of the screen frame. The plate 80 is adapted to cover up the space between the bottom member comprising the two telescoping parts 43 and 46 and the lower rail 28 comprising the rail members 41 and 42. The screen frame is preferably slightly shorter in length than the door frame F so that the bottom member comprising the two parts 43 and 46 may be adjusted vertically along the lower ends of the stiles 25 and 26 and when in their uppermost position the lower edge of the plate 80 will be substantially at the lower end of the bottom members 43 and 46.

An intermediate rail or bracing member 84 extends transversely between the two stiles 25 and 26 being constructed in tubular form similar to the construction of the stiles 25 and 26. As shown in Figure 9 the stiles 25 and 26 are provided with an opening 85 on the inner side thereof and the adjacent end of the rail or brace 84 is slidable in the opening 85. In this manner, the stiles 25 and 26 may be adjusted toward or from each other to conform the frame F to the door opening. If desired the rail or bracing member 84 may be omitted particularly where the frame F is used only as a frame for a screen door. This rail 84 may be omitted for a screen door but may be inserted in the frame F where this frame is used as a convertible door and at the time the panels to be hereinafter described are mounted on the frame F.

In Figures 16 to 23 inclusive, I have shown a slightly modified form of this invention wherein panels, either solid or transparent are adapted to be secured to the frame F shown in Figures 1 to 15 inclusive and these panels may be secured on the side of the door opposite from the screen 60 which may be left secured onto the frame F. Where the panels are secured to the frame F, the intermediate rail 84 is positioned between the side stiles 25 and 26. An upper panel frame member, generally designated as 86, is secured in face abutting relation to the adjacent side of the stiles 25 and 26 and the upper rail 27. The panel frame 86 is constructed of a sheet metal member 87 provided with marginal beads or bracing members 88. The sheet 87 is provided with a pair of window openings 89 and panels 90 are disposed on the outer side of the plate 87 and cover the openings 89. A panel holding member 91 including an L-shaped guide channel 92 is secured to the plate 87 about the outer marginal edges of the opening 89 and the panel clamping member 91 is provided with a marginal bead 93 along the marginal edges thereof which serve as a bracing means for the plate 87 when the intermediate or base portion 94 of the holding member 91 is secured as by welding or the like to the outer face of the plate 87.

In Figure 19 a double channelled member 91a is provided having a web or plate 94a which may be welded to the plate 87, and parallel channel members 92a are disposed on the opposite vertical edges thereof with a central head 93a centrally between the channels 92a.

Preferably, the lowermost channel member 95 has the base portion 96 thereof welded to the plate 87 and a detachable channel or clamping member 97 is adapted to be secured as by bolts 98 to the upper portion of the plate 87. In this manner, the transparent panels 90 may be inserted in the channels 92 from the upper end thereof and removable clamping member 97 bolted to the plate 87 transversely of the upper end thereof as shown in Fig. 16. The upper portion of the plate 87 is provided with a pair of elongated slots 99 through which the bolts 73 and 74 are adapted to pass so that the frame F may be adjusted to the desired size and the panel 86 applied thereto. The panel 86 is substantially wider than the frame F when in its narrowest position so that the plate 86 will readily engage against the adjacent face of the frame F irrespective of the width of this frame F. A lower panel 100 engages against the frame F and in the present instance, this panel 100 is constructed of sheet metal provided with beads 101 which act as reinforcing members for the panel 100 and the lower portion of the panel 100 is provided with a pair of elongated slots 102 through which the bolts 76 and 77 engage. Bolts 103 engage through the upper portion of the panel 100 and also through the lower portion of the panel 86, the bolts 103 extending through the intermediate rail or member 84 so that the panels 86 and 100 will be firmly held against the adjacent side of the frame F. It will be understood that if desired, the lower panel 100 may be constructed similar to the panel 86, if it is desired that this lower panel be transparent.

In Figures 24 to 27 inclusive, there is disclosed a modified form of door structure wherein a door frame is provided including side stiles 25a and 26a and connecting rails 27a. A panel structure comprising side stiles 56a, 57a and connecting rails 58a are disposed against one face of the door frame structure. The panel frame comprising the vertical stiles 56a and 57a and horizontal rails 58a is detachably secured to one face of the door frame and in the present instance, the rail 58a is provided with a pair of elongated slots 72a through which fastening bolts 73a engage. Bracing members 78a connect the vertical stiles 56a and 57a with the horizontal rail 58a.

The side stiles 25a and 26a are of similar construction and are shown in greater detail in Figures 26, 27 and 28. In order to provide a means whereby the panel which in the present instance, comprises the frame structure hereinbefore described, having a screen 60a mounted therein may be secured in the desired horizontal position relative to the door frame, I have provided the outer wall 29a of each stile with a pair of elongated rectangular openings 104. The opening 104 is closed by means of a plate 105 which is provided with an outwardly offset part 106 engaging within the opening 104. The opposite edges 107 of the plate 105 are positioned against the inner surface of the wall 29a and may be welded or otherwise fixedly secured to the wall 29a. The outwardly offset part 106 is provided with a plurality of horizontally spaced apart scores 108 which in the present instance, are circular in configuration. The scores 108 form plugs 109 which are frictionally held within the openings or scores 108 so that when it is desired to mount the panel on the door frame selected ones of the plugs 109 may be punched out and a screw 110 may be threaded into the opening formed by the removal of a selected plug 109.

The side stiles 56a and 57a are constructed as disclosed in Figure 25. The stile 57a is formed of an inner elongated strip 111, an outer strip 112 and a connecting part 113 which connects the outer edges of the strips 111 and 112 together. In practice, the two strips 111 and 112 and the connecting part 113 are formed integral with each other being formed by bending an elongated strip lengthwise or substantially in U-shape. The inner strip 111 is provided with a pair of vertical spaced apart beads 114 and 115 which are struck outwardly from the strip 111 and the outer part 113 is also formed with outwardly struck beads 116 and 117 which coact with the beads 114 and 115 in tightly clamping the panel or screen 60a in the stile 57a. The screw 110 engages in the space between the beads 116 and 117 as shown in Figure 25.

The panel structure shown in Figure 24 is for use during the summer, but it will be understood that a solid panel may be substituted for this screen panel so that the door frame structure may be used as a storm door during the winter.

In the use of this improved door, the stiles 25 and 26 are adapted to be formed out of sheet metal being formed from sheet metal strips which are initially bent in U-form and the free edges thereof are then bent to the configuration shown in more detail in Figures 5 and 13 so that the free edges of the strip will be interlocked and a relatively flat tubular member will be provided. The width of the frame F can be initially adjusted by sliding the telescoping rails 27 and 28 so that the stiles 25 and 26 will properly fit in the door opening and the bottom member comprising the two telescoping members 43 and 46 may be adjusted vertically by means of the bolts 45 and 47. The screen frame may then be engaged with the bolts 73, 74, 76 and 77 and the bottom plate 80 also may be engaged with the lower bolts 76 and 77. When the bolts 73, 74, 76 and 77 are tightened, the frame F is securely held in its adjusted position. Preferably, the screen is secured by means of the clamping members 69 on one side of the frame F and the panels 86 and 100 are secured on the opposite side thereof, particularly during the winter months. During the summer months, the panels 86 and 100 may be removed from the frame F with the screen disposed on the inner side of the door frame.

A door constructed according to this invention can be constructed out of relatively light sheet metal and will not warp so that the door will last for an indefinite period and can be readily fitted to different door openings by the purchaser thereof.

Where the panel securing means disclosed in Figures 24 to 27 are used, the door frame structure may be adjusted to fit the door opening and when this has been done, the fastening members 73a may secure the upper and lower ends of the panel frame structure to the door frame and the vertical stiles or sides of the panel may be secured to the vertical stiles of the door frame by punching out the desired plugs 109 in the scored strip 106 and then threading the screw 110 into the opening formed by the removal of the selected plugs 109. The screw 110 may be of the type which will cut its own threads in the strip 106 as it is threaded into the openings 108.

While the structure hereinbefore described has been set forth as applied to doors, this same structure may be applied as well to window structures for providing a combination screen and storm sash, and it will, therefore, be understood that the term door referred to in the claims also refers to window sashes.

What I claim is:

1. A door frame comprising tubular or formed side stiles, an upper rail fixed to said stiles at the upper ends thereof, a lower rail fixed to said stiles at a point spaced upwardly of the lower ends thereof, a bottom member slidably engaging the lower ends of said stiles, said bottom member arranged below said lower rail and independently bodily adjustable relative to said stiles and lower rail, and means engaging said stiles and said bottom member securing said bottom member in vertically adjusted position on said stiles.

2. A door frame comprising continuous tubular or formed side stiles, oppositely disposed upper rail members secured within and extended from said stiles, oppositely disposed lower rail members secured to said stiles at a point upwardly of the lower ends thereof, a horizontally extensible and vertically bodily adjustable bottom member slidably engaging the outer face of the lower ends of said stiles, and releasable means engaging said stiles and said bottom member securing said bottom member to the said stiles.

3. A door comprising continuous tubular or formed side stiles, telescoping upper rail members secured to said stiles, telescoping lower rail members secured to said stiles at a point upwardly of the lower ends thereof, a horizontally extensible and bodily vertically adjustable bottom member slidably engaging the outer face of said stiles below the lower rail members, releasable means engaging said stiles and said bottom member securing said bottom member to the said stiles, a panel, and means securing said panel to said upper and lower rail members in a manner whereby to hold said rail members in adjusted position.

4. A door comprising a pair of horizontally adjustable frame members, a panel engaging against a face of said members, means securing said panel to said members in a manner to hold said members in adjusted position, a horizontally extensible vertically bodily adjustable bottom frame member slidably engaging the lower portion of said frame members, and means securing said bottom frame member in vertically adjusted position on said first members.

5. A door comprising a pair of continuous vertically disposed side stiles, a pair of rail members carried by each stile, one adjacent each end thereof, the rail members of one stile telescoping the rail members of the other stile, a pair of bodily vertically adjustable horizontally extensible telescoping bottom members, each of said bottom members having a looped outer end slidably encompassing the lower end of a stile, and releasable means engaging said bottom members and said stiles securing said bottom members in vertically adjusted position on the lower ends of said stiles.

6. A metal door comprising a pair of continuous tubular side stiles, a pair of tubular rail members carried by each stile one adjacent each end thereof, the rail members of one stile telescoping the rail members of the other, a pair of tubular vertically bodily adjustable horizontally extensible telescoping bottom members, each of said bottom members including a looped outer end portion slidingly engaging about a lower end of a stile, each of said stiles having an elongated slot adjacent the lower end thereof, and a bolt engaging through the looped end of a bottom member and a slot of a stile to adjustably secure said bottom member on a stile.

7. A door comprising continuous tubular side stiles, telescoping upper rail members secured to said stiles at the upper end thereof, telescoping lower rail members secured to said stiles at a point upwardly of the lower ends thereof, a bodily vertically adjustable horizontally extensible bottom member, looped end portions carried by said bottom member slidingly engaging said stiles below said lower rail members, releasable means securing said bottom member in vertically adjusted position on said stiles, a pair of panel members engaging one side of said stiles and said rail members, a screen frame engaging the opposite side of said rail members and said stiles, a screen in said screen frame, and means engaging through said rail members, said panel members and said screen frame securing said panel members and said screen frame on said rail members while simultaneously holding said rail members in longitudinally adjusted position.

8. A door comprising continuous tubular or formed side stiles, horizontally adjustable upper rail members secured to said stiles at the upper end thereof, horizontally adjustable lower rail members secured to said stiles at a point upwardly of the lower ends thereof, a bodily vertically adjustable horizontally extensible bottom member, looped end portions carried by said bottom member slidingly engaging said stiles below said lower rail members, releasable means securing said bottom member in vertically adjusted position on said stiles, a pair of panel members engaging one side of said stiles and said rail members, a screen frame engaging the opposite side of said rail members and said stiles, a screen in said screen frame, means engaging through said rail members, said panel members and said screen frame securing said panel members and said screen frame on said rail members while simultaneously holding said rail members in longitudinally adjusted position, an intermediate rail loosely engaging at the opposite ends thereof in said side stiles, and means securing said panel members to said intermediate rail.

9. A door comprising tubular side stiles, telescoping upper rail members secured one to each of said stiles to the upper end thereof, telescoping lower rail members secured to said stiles at a point upwardly of the lower ends thereof, a hollow bodily vertically adjustable horizontally extensible bottom member, looped end portions carried by said bottom member, slidingly engaging said stiles below said lower rail members, said lower rail member having an elongated slot adjacent the lower end thereof, bolts engaging through the looped ends of said bottom member and the slots of said stiles whereby to vertically adjust said bottom member, a rectangular screen frame or panel engaging one side of said stiles and said rail members, said screen frame or panel having a pair of elongated slots at each end thereof, bolts engaging through said rails and said latter slots to secure said screen frame on said rail members while simultaneously holding said rail members against longitudinal movement, and a lower plate for said screen frame, said plate having reverted opposite end portions engaging about the lower end portions of said screen frame, said plate also having a pair of elongated slots therein to receive the lower bolts engaging through the lower slots of said screen frame, said plate covering the adjacent side of said bottom and said lower rail members.

10. A door frame comprising a pair of continuous side stiles, a horizontally extensible upper rail formed of a pair of telescopic members each having a terminal portion secured within the upper terminal portion of a stile, a horizontally extensible lower rail formed of a pair of telescopic members each having a terminal portion secured within a stile above the lower terminal portion of the latter, a bodily vertically adjustable horizontally extensible tubular bottom member formed of a pair of telescopic sections each having a loop-like outer terminal portion slidably encompassing the lower terminal portion of a stile, means for releasably securing the members of the upper rail together, means for releasably securing said bottom member in vertically adjusted position, and means common to the members of the lower rail and the sections of the bottom member for releasably connecting them together.

11. A door frame comprising a pair of continuous side stiles, a horizontally extensible upper rail formed of a pair of telescopic members each having a terminal portion secured within the upper terminal portion of a stile, a horizontally extensible lower rail formed of a pair of telescopic members each having a terminal portion secured within a stile above the lower terminal portion of the latter, a bodily vertically adjustable horizontally extensible tubular bottom member formed of a pair of telescopic sections each having a loop-like outer terminal portion slidably encompassing the lower terminal portion of a stile, means for releasably securing the members of the upper rail together, means for releasably securing said bottom member in vertically adjusted position, means common to the members of the lower rail and the sections of the bottom member for releasably connecting them together, and a horizontally disposed brace slidably mounted in said side stiles between and spaced from said upper and lower rails.

12. In a door, a pair of continuous side stiles, a horizontally extensible upper rail formed of a pair of telescopic members each having a terminal portion secured within the upper terminal portion of a stile, a horizontally extensible lower rail formed of a pair of telescopic members each having a terminal portion secured within a stile above the lower terminal portion of the latter, a bodily vertically adjustable horizontally extensible tubular bottom member formed of a pair of telescopic sections each having a loop-like outer terminal portion slidably encompassing the lower terminal portion of a stile, a screen element positioned against corresponding faces of said stiles and rails, means for detachably connecting said element to said stiles, means for detachably connecting said element to said upper rail and the members of the latter together, means for detachably connecting said element to said bottom element, said upper rail and the members of the latter together, and means for releasably connecting said bottom member in vertically adjusted position to said stiles.

ARTHUR A. VAN ATTA.